Patented June 26, 1951

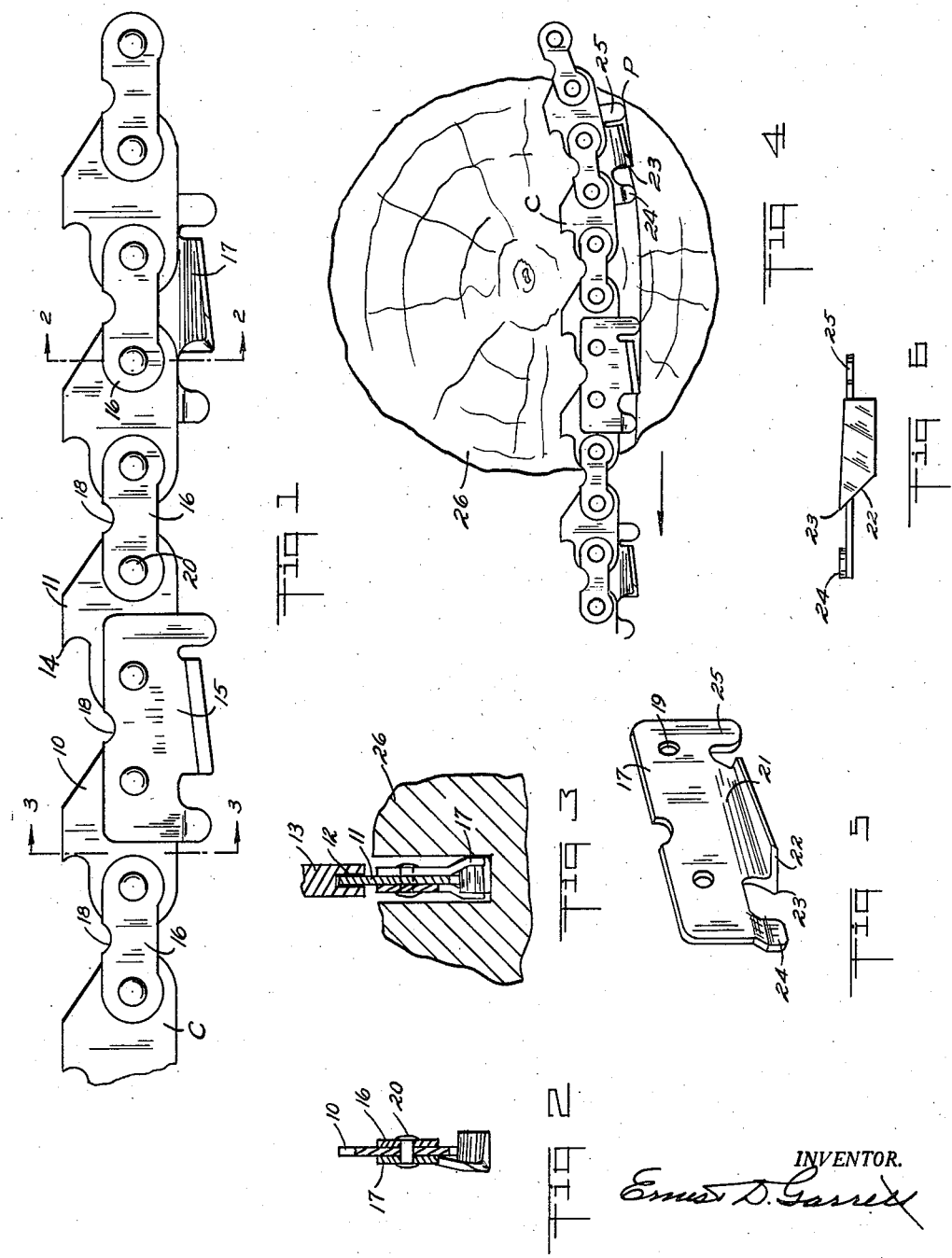

2,558,678

UNITED STATES PATENT OFFICE 2,558,678

SAW CHAIN

Ernest D. Garrett, Shreveport, La.

Application May 23, 1949, Serial No. 94,820

7 Claims. (Cl. 143—135)

My invention relates to a chain adapted for use on a chain saw and has for one of its objects, the provision of a chain which is easy to manufacture and assemble and which provides for a fewer number of separately formed links than any chain now known or described in the prior art. Such a chain would obviously be cheaper to manufacture and a proportion of the savings could be extended to the ultimate user.

It is also an object of the invention to provide a chain which has a smooth cutting action with no tendency to dig into the log being cut, either in the plane of cut or laterally away from the plane of cut. The accomplishment of such a smooth cutting action also produces a smooth face on the log. This feature is desired even over the cutting speed of the saw and has not been successfully accomplished until the present invention. Loggers and timber checkers keep on-the-job records by making certain marks on the ends of the logs being cut and hauled. If these marks are made on log ends which are rough and torn, the marks will not be clearly legible and will be hard to identify. Poor marking not only causes considerable waste of time but many errors in the loggers' tally sheets of the amount of lumber cut.

It is another object of the invention to provide a chain having successive tooth groups including a right and left-hand cutting link in each group and a leading and trailing depth gage on each cutting link. In similar prior art chains no attempt has been made to supply a rear depth gage, the theory being that the leading depth gage would engage the kerf bottom defined by the saw and prevent the cutting tooth from digging in. Actual practice, however, shows that a trailing depth gage helps tooth action in that it rides the kerf bottom and prevents a rearward tilting of the tooth when the forward cutting edge begins a cut. Thus substantially all of the chatter in the chain is eliminated.

A further object of the invention not found in prior art chains is to provide guides on each of the cutting links adapted to ride the vertical side walls of the kerf to prevent any tendency in the cutting links of the chain to dig-in or pull-in a lateral direction. This is especially advantageous when the saw is used to make a ripping cut with the grain of the wood where normally the teeth would be urged to follow the grain instead of the plane of cut.

Another object of the invention is to provide a pair of symmetrically formed, right and left-hand cutting links spaced laterally along the chain having extensions directed angularly toward the median plane of the chain with the leading edges of the extensions sharpened to simultaneously cut and lift the shaving from the log being cut. It is obvious, therefore, that if the closely spaced cutting teeth not only cut and lift the shaving from the log without assistance from a drag tooth, then the actual linear speed of the chain might even be reduced to leave the cutting speed comparable to that of chains found in the prior art.

Another object of the invention is to provide a chain for a chain saw wherein all leading and trailing depth gages are spaced substantially equidistantly along the length of the chain to eliminate gaps which might stall or choke the chain when making a cut.

A further object of the invention is to provide a chain for a chain saw wherein the tooth groups may be altered for cutting certain types and sizes of logs, alternate cutting teeth being replaced by a single spacer link. Such an arrangement reduces the number of teeth subject to wear and lessens time and expense of sharpening.

Other objects will be found in the course of the following detailed description when viewed together with the accompanying drawing in which:

Fig. 1 is a broken side elevational view embodying my invention in a chain for a chain saw.

Fig. 2 is a cross-sectional view taken along lines 2—2 of Fig. 1.

Fig. 3 is a cross section view taken along lines 3—3 of Fig. 1, a portion of a log and a prior art guide member being added.

Fig. 4 is a broken side view of the chain making a cross cut through a log, a portion of the chain being curved to correspond to the curvature of all types of prior art guide blades.

Fig. 5 is an isometric view of one of the cutting links of the chain, the other cutting link being symmetrically similar but faced in the opposite direction.

Fig. 6 is a bottom view of the cutting element shown in Fig. 5.

In the drawing, the chain is designated generally by the letter C and is made up of separately formed links pivotally joined together for any desired length. The section shown in Fig. 1 constitutes a group which is successively repeated for the chain length. This group consists of successive guide links, 10 having an upper tab, 11 adapted to ride in a channel 12 formed along the peripheral edge of a prior art blade 12. The leading edge of each tab 11 is provided with a hook 14 which has a tendency, as it rotates, to scrape the bottom of the channel 12 of the blade 13 and remove all foreign bodies such as dirt or sawdust that might have accumulated therein.

Pivotally joined to a leading and training end of a pair of guide links 10 is a right-hand cutting link 15. On the opposite side of the chain and matched with the cutting link 15 is a plain spacer link 16. Further down the length of chain away from the direction of cut is a left-hand cutting link 17. Right and left-hand cutting links, in this instance, are taken facing the chain in the direction of cut. Between each right and left-hand cutting link is a pair of spacer links 16 joining successive guide links 10 and of a length to space the cutters equidistantly along the chain. Each of the spacer links and cutter links is provided with spaced indentures 18 corresponding to the pitch of a given driving pulley. As can be seen from the above description and drawing, only four separately formed members are needed to constitute a complete group of the chain. This is highly advantageous to the manufacture of the chain since the original cost and maintainence of tools and dies is directed toward a minimum number of component parts.

For use in certain types of woods or when cutting logs of great diameter where greater chip clearance is needed, it is within the concept of the present invention to change the grouping of the links by inserting an additional guidelink 10 and an additional pair of spacer links 16. For a given length of chain this arrangement reduces the number of cutting teeth to two-thirds, thereby subjecting fewer number of links to wear and reducing time and expense in chain sharpening.

The novelty of the present invention resides not only in the grouping of the chain elements, but also in the shape of the cutting links described as follows:

As aforementioned, the cutting links are symmetrically the same but are made right and left-hand and spaced apart laterally by alternately lapping them with the guide links 10 in the manner as shown in Fig. 1. The cutting link is provided with spaced holes 19 for the chain rivets 20. A medial portion of the link is provided with a depending shank 21 bent outwardly away from the vertical plane of the link and receding rearwardly in the manner shown in Fig. 6. The bottommost end of the shank 21 is then bent upwardly and inwardly toward the median plane of the chain and is left to recline at an angle slightly greater than 90 degrees from the vertical tooth plane. In actual manufacture a machined cut is then taken along the bottom face of the bend and also along the side thereof to provide sufficient working clearance for the tooth as may be seen more clearly in Fig. 2. The leading or cutting edge 22 of the angular tooth bottom recedes inwardly toward the median plane of the link and is provided with a round toe 23 on its outer end which defines one of the side walls of the kerf when sawing. As can be seen from the drawing, this round toe 23 does not present a definite sharp point to the work which might be easily dulled or broken, but is formed radially in the manner more nearly resembling a machine tap or a lathe tool in that it cuts and lifts the work simultaneously.

In an effort to produce the cutting action found in the present invention, one prior art chain discloses a cutting tooth having a definite arcuate bend formed of the shank portion and turned inwardly to define the cutting edge, while such construction permits simultaneous filing of the leading edge of the shank and the leading edge of the horizontal cutting section with a rat-tail file, it has been found that the radius of the bend is so great as to force the cutting edges of the tooth to cut the same wood fibers in two or more places when making a cut, thus not only causing undue work for the tooth, but also subjecting it to greater wear and lessening the time between sharpenings.

In the present invention it will be noted that only the point 23 of the cutting section is formed on a slight radius and the leading edge of the shank 21 is substantially straight, thus making the cutting point an arcuate vertex of the angle between the shank and the horizontally disposed cutting edge.

The slight reclining angle given to the top surface of the bend as shown in Fig. 2 gives a definite inward roll to the shaving when cut to prevent the same from clogging under the joining links and to put it toward the center of the chain where it may be removed from the kerf by the succeeding leading depth gauge 24.

The leading depth gage 24 is slightly higher than the toe 23 in the cutting plane so that only the proper amount of the material may be removed by the tooth at a single pass through the wood. It will be noted that the depth gage 24 is bent outwardly from the vertical plane of the link and then downwardly parallel to the vertical plane with the outside face of the lower bend on a line parallel to the outside cutting line of the toe 23. This arrangement permits the outside face of the lower bend on the depth gage 24 to ride one of the side walls of the kerf to act as a lateral guide to prevent the toe 23 from digging in and pulling the cut to one side. Such a combination depth and lateral gage for the cutting teeth has proven highly satisfactory, especially when taking horizontal cuts on standing timber.

The rear depth gage 25 is made similar in size to the front gage but lies in a straight, vertical plane with the link proper, the bottom contact point being on the same cutting line with the toe 23.

By referring to Fig. 4 of the drawing a clearer understanding of the full advantages of the rear depth gage may be had. In this figure a portion of a chain made according to the teachings of the present invention is shown advancing through a log 26 in the direction of the arrow. Actual tests of prior art chains have shown that if the chain is stalled at all when passing through a log, such stalling usually occurs when the cut is approximately 90 percent complete, that is, when the saw has cut through an approximate 90 percent of the log diameter, prior to the present invention many tests have been made to overcome such stalling. One theory advanced has been that the upper portions of the log causes a pinching on the blade; hence steps have been taken in re-designing the blade. Other theories have been that the teeth have been improperly shaped or that the various clearance angles are incorrect; yet none of which have entirely overcome the difficulty. Saw chains are commonly known to dig into a log being cut with such force and wedge themselves to such a degree that a portion of the log must be chopped away or a lumberman's wedge used to remove it.

As seen in this figure, the chain C is approaching an approximate 90 per cent cut through the log diameter, substantially all of the guide blades now being used are made arc-shaped, at least at their extreme ends, and it is quite obvious that as the cut passes the diametral center of the log, the entrance angle of the cutting teeth becomes more and more acute. In the position shown, even with a leading depth gage, the cutting teeth will strike the log at a point well above the cutting toe 23 due to the blade curvature and the receding arc of the log periphery. As soon as the tooth engages it will obviously dig downwardly and pull the chain slack with it. If there is no trailing depth gage, the gap between teeth is considerably lengthened and to such an extent that the amount of cut taken by the succeeding tooth is so great as to cause the chain to stall.

With the arrangement as shown in Fig. 4 the cutting tooth entering the log at this acute angle is not left to dig vertically, but is brought immediately to a true cutting plane as soon as the trailing depth gage 25 enters the cut, not only minimizing the gap between the cutting teeth, but actually raising the preceding cutting tooth to a true cutting plane. Actual tests made of a chain made according to the present invention has failed to stall the chain at any point in a log.

Many chains have been stalled at the point of exit of the chain from the log. Such stalling has frequently been traced to the fact that the grouping of the chain links is such that there is a lengthy gap left between cutting teeth. Thus, when an operator suddenly arches the saw forwardly in the direction of cut, the cutting tooth following the one just leaving the log is so far behind due to the lengthy gap between teeth, that the amount of cut required is too great and it will consequently dig in and stall the chain. By the addition of a rear depth gage on each cutting tooth such a disadvantage has been entirely overcome.

As aforementioned, additional guide links 10 and additional spacer links 16 may be added to reduce the number of cutting links in the chain by two-thirds. This has special advantage when cutting large timber where greater chip clearance is needed between cutting teeth. It is recommended that the chain be altered only for the purpose so stated since only the close grouping of the cutting teeth elements will produce the best results.

There are two general methods of mounting chains as taught in the prior art. One of the methods is to provide a center link having a tab 11 as shown in the present drawing which is adapted to ride in a raceway or channel as brought out in the above description. This construction would, of course, call for spacer links to join the center links together and provide for mounting right and left-hand cutting links on each side of the center links. A variation of this method is to place the cutting links in the center and provide them with tabs for the channel and some means of driving the chain around the sprockets.

The other general method is to provide a pair of spaced, opposing tabs, whether on the same link or on matched links, which are adapted to frictionally engage the marginal rim portion of the guide blade to hold the chain instead of riding in a channel. Several variations in this method might also be used to provide a series of tabs to straddle the guide blade.

While these many variations are not shown in the present drawing, the method that is shown of forming the several link elements and the manner of grouping them together to make a chain, is believed to be the simplest and most economical since the elements are fewer in number for a complete group and the elements of that group are simple in shape and require fewer bends. It is understood, however, that the present invention may be made according to any of the several variations without departing from the spirit and scope of the invention as defined by the following claims.

I claim:

1. A chain for a chain saw comprising successive groups of separately formed link members pivotally joined and overlapped in tandem formation to permit driving of the same when looped around a pair of sprockets, means on said chain cooperating with a guide blade provided on said saw for guiding said chain in a true cutting plane, a pair of cutting links in each of said groups, said cutting links being spaced longitudinally along said chain and provided with alternate right and left-hand cutting teeth, and an integrally formed leading and trailing depth gage on each of said cutting links.

2. The chain as claimed in claim 1 wherein the leading depth gage on each cutting link is extended outwardly from the median plane of the link to lie in the plane at the outer extremity of its own cutting tooth to constitute lateral guide members for said chain.

3. A chain for a chain saw comprising a group of separately formed link members pivotally joined in tandem formation to permit driving of the same when looped around a pair of sprockets, one of said group comprising a guide link having an upper tab adapted to ride in a raceway provided on said chain saw to position said chain in a true cutting plane, other members of said group comprising a pair of symmetrically formed right and left-hand cutting links spaced laterally and longitudinally along said chain, the last member of said group comprising a spacer member and a leading and trailing depth gage integrally formed on each cutting link.

4. The chain as claimed in claim 3 wherein all leading and trailing depth gages in successive groups are substantially equidistantly spaced longitudinally along said chain.

5. A chain having successive tooth groups, each group comprising a pair of symmetrically formed right and left-hand cutting links spaced laterally along said chain, a spacer member and a guide member, each of said cutting links adapted to lap alternately with a spacer member and a guide member, each of said cutting links provided with an integrally formed depth gage on its leading and trailing ends, a medial portion of said cutting link having a depending shank portion directed outwardly from the vertical tooth plane and extended substantially vertically and parallel to the vertical plane thereof, said shank portion being finally bent inwardly toward the median plane of said chain to form a cutting tooth, said cutting tooth being made to recline at an angle equal to or greater than a right angle from the vertical plane of said cutting link, said cutting tooth provided with a leading cutting edge receding rearwardly from the direction of cut taken by said chain.

6. A chain having successive tooth groups, each group comprising a pair of symmetrically formed right and left-hand cutting links spaced laterally along said chain, a spacer member and a guide member, each of said cutting links provided with an integrally formed depth gage on its leading and trailing ends, a medial portion of each of said cutting links being inclined outwardly from the median plane of said link and extended downwardly substantially parallel to the vertical plane of said link, the lower portion of said shank bent upwardly and inwardly toward the median plane of said chain to form a substantially horizontal cutting tooth section, the leading edge of said shank portion provided with an inward bevel for a portion of its height and adjoining the outer extremity of said cutting section to define an arcuate cutting point, the leading depth gage having its bottommost point positioned slightly higher than said cutting point and its outside surface on a line parallel with the same, said outside surface of said leading depth gage adapted to ride the side wall surface of the kerf made by said chain to prevent lateral movements thereof.

7. The chain as claimed in claim 6 wherein the bottommost point of said trailing depth gage lies on the line of cut made by said arcuate cutting point.

ERNEST D. GARRETT.

REFERENCES CITED

The following references are of record in the file of this patent:

UNITED STATES PATENTS

| Number | Name | Date |
|---|---|---|
| 2,326,854 | Hassler | Aug. 17, 1943 |
| 2,508,784 | Cox | May 23, 1950 |

FOREIGN PATENTS

| Number | Country | Date |
|---|---|---|
| 564,152 | Great Britain | Sept. 14, 1944 |